Aug. 6, 1968  G. D. SIMONDS, JR  3,395,578
COMPOUND METER AND VALVE
Filed Sept. 28, 1965  4 Sheets-Sheet 1
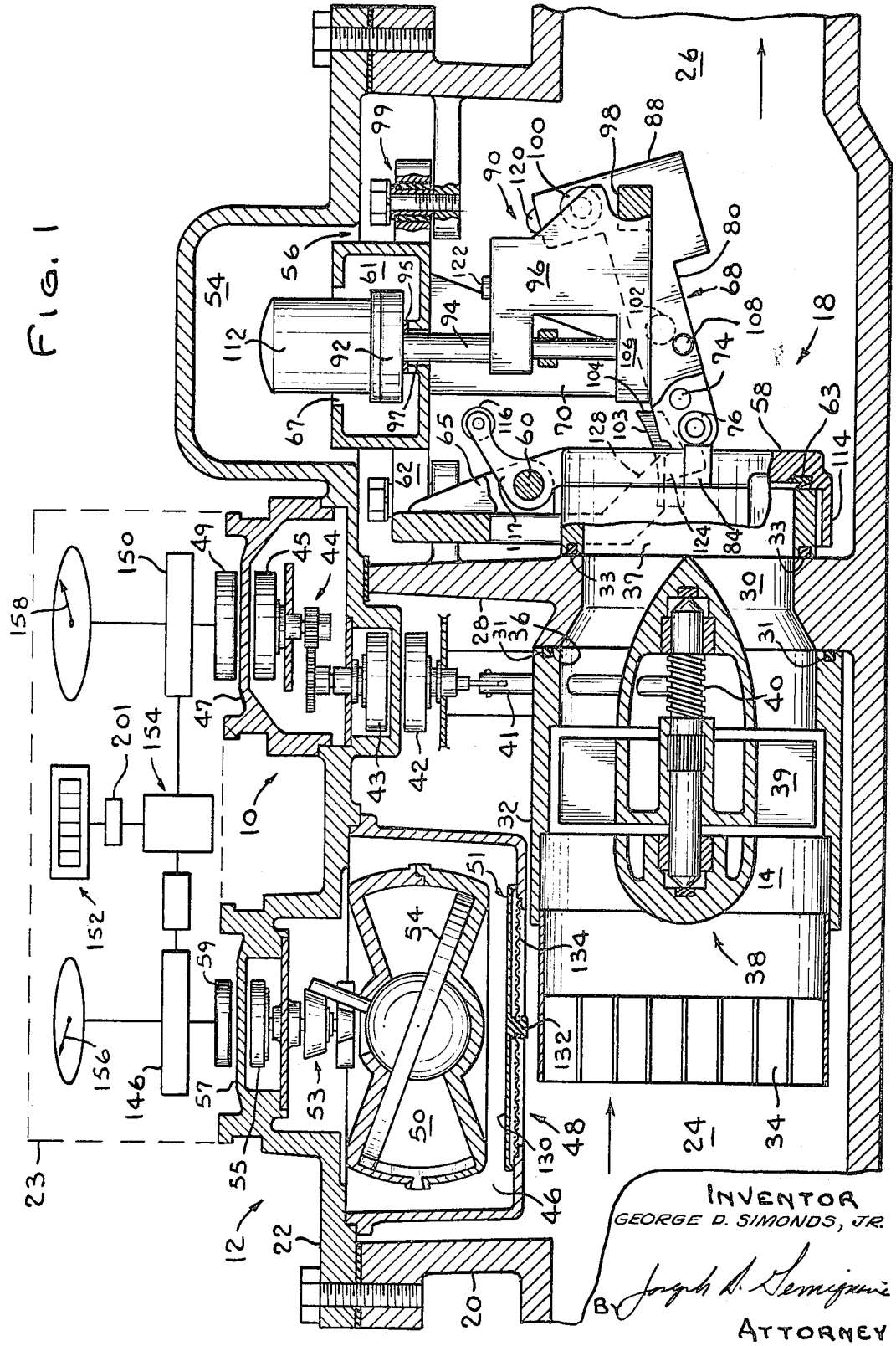
INVENTOR
GEORGE D. SIMONDS, JR.
BY Joseph D. Lemigue
ATTORNEY Aug. 6, 1968  G. D. SIMONDS, JR  3,395,578
COMPOUND METER AND VALVE
Filed Sept. 28, 1965  4 Sheets-Sheet 2
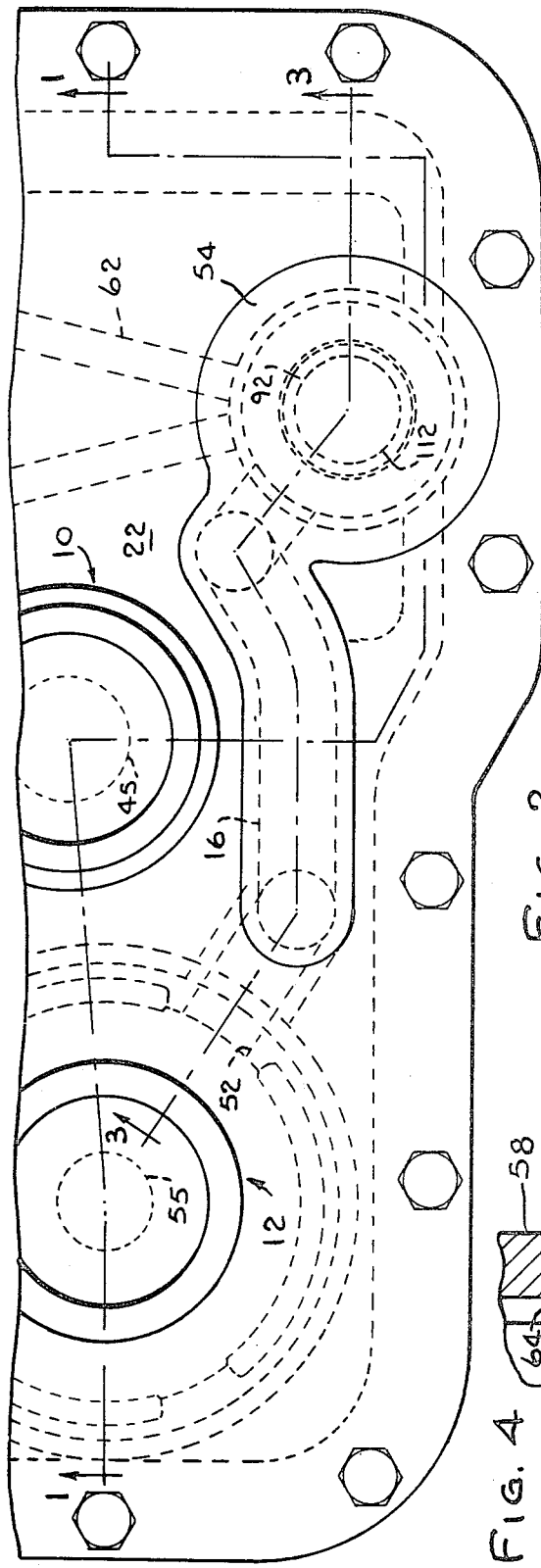
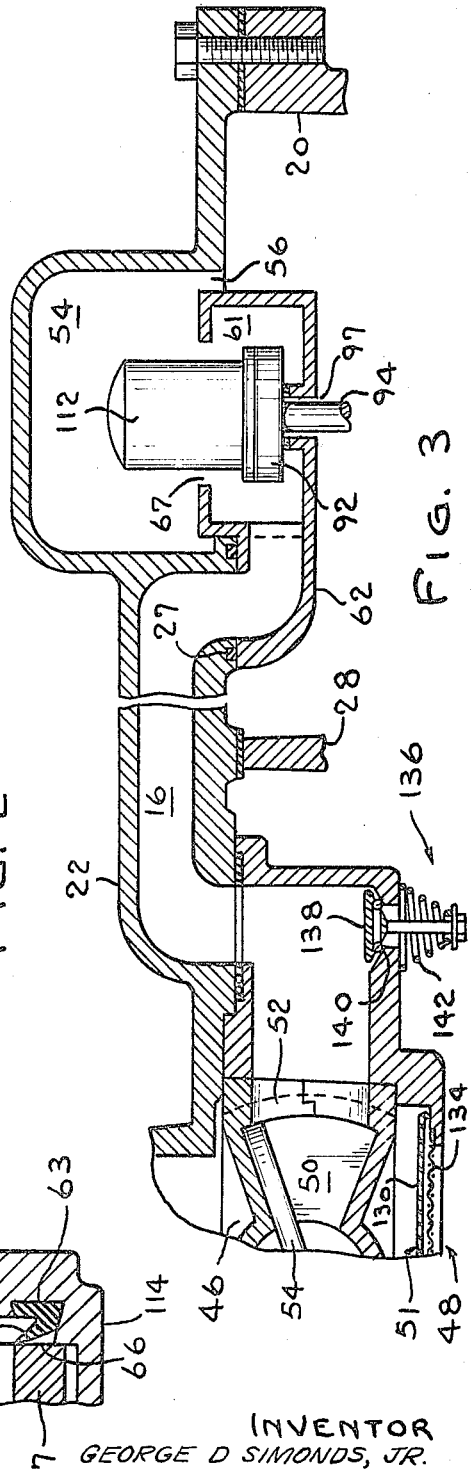
INVENTOR
GEORGE D SIMONDS, JR.
BY Joseph A. Gemignani
ATTORNEY

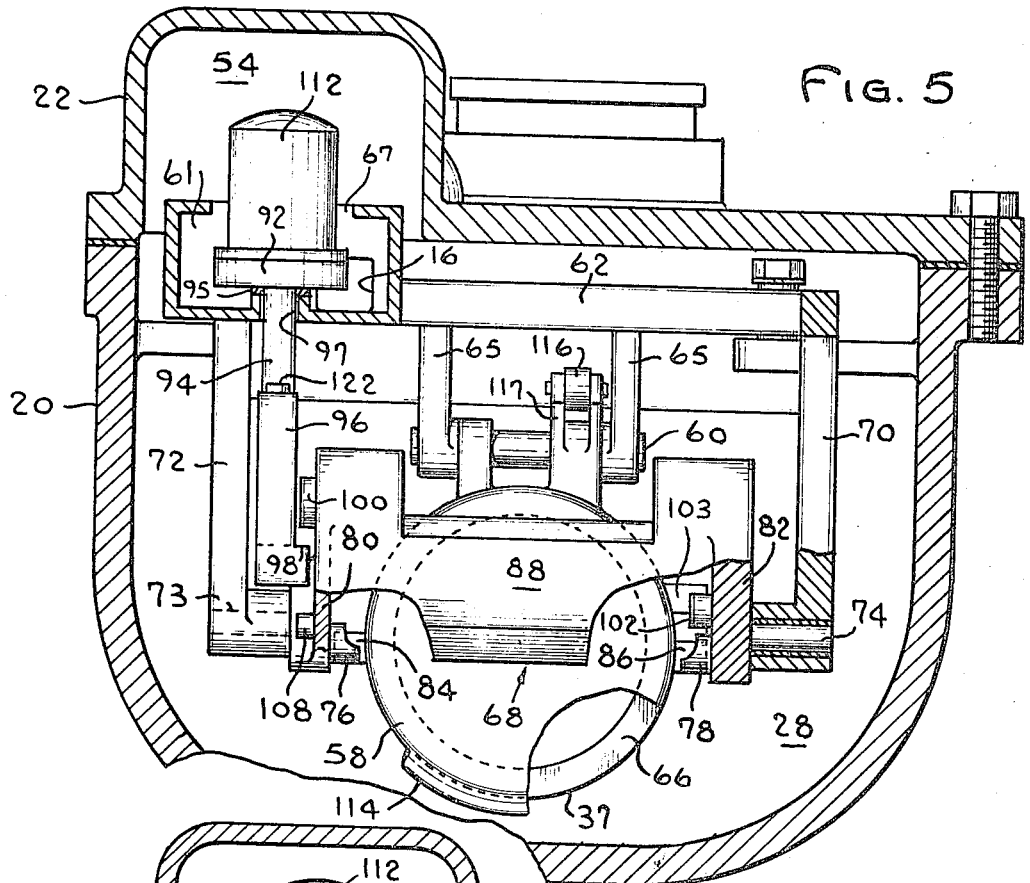
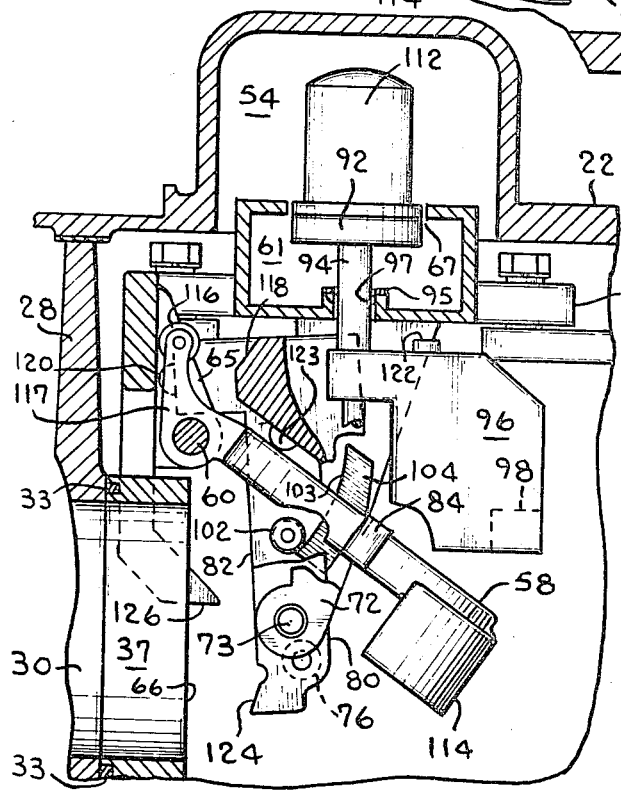
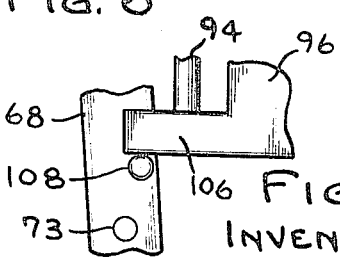

Aug. 6, 1968    G. D. SIMONDS, JR    3,395,578
COMPOUND METER AND VALVE
Filed Sept. 28, 1965    4 Sheets-Sheet 4
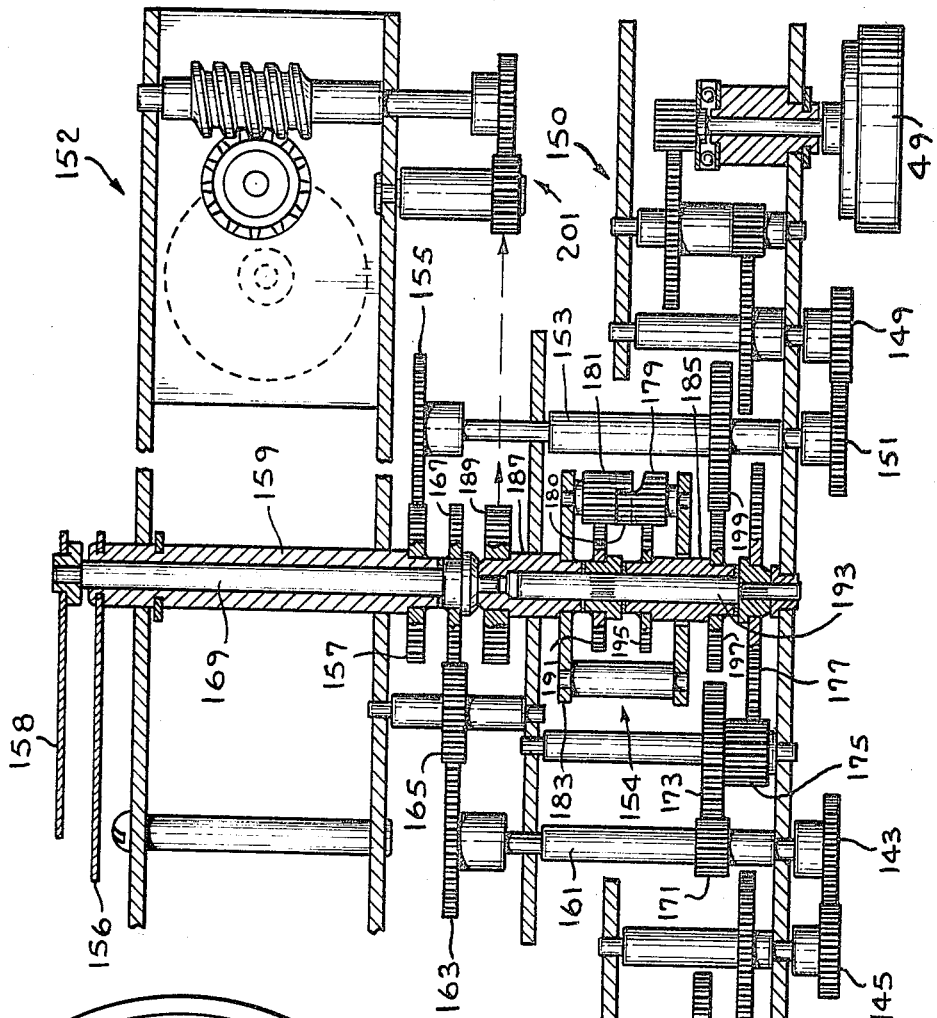
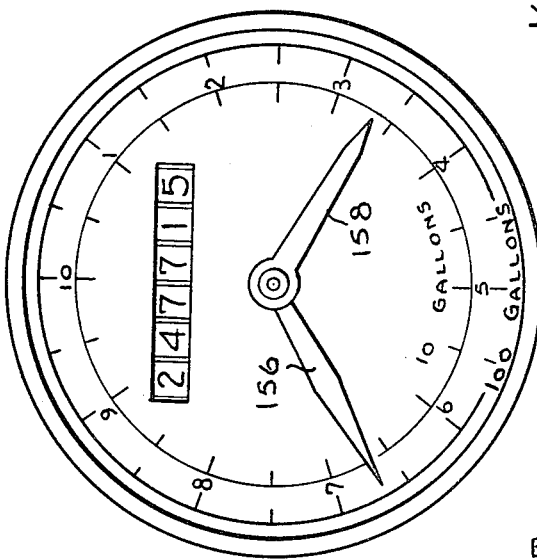
INVENTOR
GEORGE D. SIMONDS, JR.
BY Joseph A. Lemignani
ATTORNEY United States Patent Office 3,395,578
Patented Aug. 6, 1968

3,395,578
COMPOUND METER AND VALVE
George D. Simonds, Jr., Mequon, Wis., assignor to Badger Meter Manufacturing Company, Milwaukee, Wis., a corporation of Wisconsin
Filed Sept. 28, 1965, Ser. No. 490,862
28 Claims. (Cl. 73—197)

ABSTRACT OF THE DISCLOSURE

A valve arrangement is provided wherein a valve member for controlling flow in a high flow passage is held closed by a lever. The lever is movable relative to the valve member and holds the valve member closed until opening assist means disposed in a low flow passage initiates movement of the lever to reduce the holding force on the valve. Flow through the high and low flow passages occurs, respectively, in response to open and closed conditions of the valve member. The valve arrangement is also used to control flow through the high and low flow passages of a compound meter. In a further aspect of the compound meter, a single register assembly is driven from both the high and low flow meters through a differential drive with separate calibrating indicators and drives provided for both the low and high flow meters.

---

This invention relates to compound meters and to control valve arrangements and register assemblies therefor.

Compound meters are well known and generally include high and low flow measuring elements and a valve mechanism for controlling flow through the measuring elements. Generally, the valve mechanism blocks flow through the high flow measuring element when flow is below a particular rate and is effective to open the meter to flow through the high flow measuring element when the flow rate increases to a point at which it cannot be handled accurately by the low flow measuring element.

A general object of this invention is to provide an improved compound meter.

Another object of this invention is to provide an improved valve mechanism for controlling flow through the high and low flow measuring elements of a compound meter.

A further object of this invention is to provide a control valve arrangement which achieves accurate operational crossover between high and low flow passages at a desired flow rate.

For the achievement of these and other objects, this invention proposes an arrangement wherein the valve controlling flow through the high flow measuring element of a compound meter is held closed in a positive manner by a closure mechanism when the valve is subjected to a flow rate, and corresponding pressure differential, which is within the range which can be accurately handled by the low flow measuring element. A valve opening assist arrangement is operatively associated with the closure mechanism and is exposed to flow through the low flow measuring element and passage. The valve opening assist arrangement is responsive to the flow rate in the low flow measuring element line and, in response to an increase in flow rate in the low flow line, is effective to relieve the force holding the valve closed as the flow rate approaches a predetermined crossover rate. When the predetermined flow rate is reached the valve opens quickly (virtually instantaneously) and completely to provide a precise operational crossover point from flow through the low flow measuring element alone to flow through the high flow measuring element. The valve is held open by the force of the flowing medium and moves toward a closed position in response to reduced flow through the high flow measuring element. As a predetermined operational crossover point is approached the closure mechanism is activated to exert a closing force on the valve and achieve an accurate crossover from flow through the high flow measuring element to flow through the low flow measuring element alone.

In a compound meter the register mechanism must be capable of recording flow through both the high and low flow measuring elements. In this regard a further object of this invention is to provide a simplified register assembly capable of totalizing flow through both measuring elements. Common practice is to provide a separate register drive for both measuring elements and, in accordance with specific aspects of this invention, a single register stack is connected to and driven by both register drives through a differential drive. The single register stack simplifies the meter and the differential drive achieves accurate measurement.

A further problem encountered in this type of meter is that of calibrating both measuring elements. Calibration is commonly achieved by selecting the necessary gear ratio in the high and low flow element register drives to produce a given reading when a given volume of liquid has passed through the respective elements. Selection of the necessary gear ratios is commonly achieved by the insertion of the proper ratio gear combination in each register drive. An additional, more specific, object of this invention is to simplify and facilitate calibration of the register drives of a compound meter. This object is preferably achieved by providing separate calibrating indicators and drives for both the low and high flow measuring elements so that calibration of each can be carried on independently of the other.

Other objects and advantages will be pointed out in, or be apparent from, the specification and claims, as will obvious modifications of the embodiments shown in the drawings, in which:

FIG. 1 is an axial section view of a compound meter embodying this invention taken generally along line 1—1 of FIG. 2 and with the register portion thereof being shown in generally schematic form;

FIG. 2 is a top plan view of a portion of the meter illustrating the low flow passage;

FIG. 3 is a section view taken generally along line 3—3 of FIG. 2;

FIG. 4 is an enlarged section view of the seal portion of the valve member;

FIG. 5 is an end view of the valve mechanism taken from the outlet side thereof;

FIG. 6 is a partial view of the compound meter illustrating the valve mechanism in its open position;

FIG. 7 is an enlarged view of a portion of the valve member and the valve member opening assist mechanism;

FIG. 8 is a partial view of a modified form of the valve member and the closure mechanism therefor;

FIG. 9 is a top plan view of the readout portion of the single register; and

FIG. 10 is a partially schematic illustration of the high and low flow register drives, the differential connection to the single register stack and the separate calibrating arrangements for each measuring element.

With particular reference to the drawings, a compound meter is illustrated as including high flow measuring element 10 of the turbine type and low flow measuring element 12 of the nutating disk type arranged to respond to flow through high flow passage 14 and low flow passage 16 (see FIGS. 2 and 3), respectively. Valve assembly 18 controls flow through the high and low flow passages and when closed is effective to direct all flow through the low flow passage.

Structurally the compound meter includes a housing made up of main body 20, top or cover 22 and a register cap 23 illustrated schematically in FIG. 1. Inlet 24 and outlet 26 are formed in the body. Partition 28 is disposed between the inlet and outlet openings and engages the underside of cover 22. The partition is imperforate except for opening 30 and divides the interior of the housing into an inlet and an outlet side.

High flow passage 14 is formed by hollow tubular member 32 suitably attached on the inlet side of partition 28. Tubular member 32 communicates with inlet 24 through screen and straightening vane assembly 34 which is effective to counteract turbulence occurring at inlet 24 and insure proper presentation of the flowing medium to the measuring element in the high flow passage. Outlet end 36 of member 32 registers with partition opening and is sealed at that point by seal 31. Tubular extension 37, provided on the outlet side of partition 28, also registers with opening 30 and is sealed at that point by seal 33. Outlet end 36, opening 30 and extension 37 cooperate to form the outlet for the high flow passage and member 37 also provides a seat for valve mechanism 18 as will be described more completely hereinafter. High flow measuring element 10 is of well-known construction and includes a conventional turbine assembly 38 having a turbine blade 39 mounted for rotation within high flow passage 14. The turbine blade rotates in response to the flow through the high flow passage and this rotation is transmitted by means of worm gear 40 and a pinion gear, not shown but engaging worm gear 40 and fixed to shaft 41, to a magnetic transmission comprising magnetic members 42 and 43 disposed on opposite sides of the imperforate wall of cover 22. Rotation of member 43 is transmitted through a ratio gear train 44 to rotatable magnetic drive member 45 which again transmits rotation through imperforate wall 47 to a second magnetic member 49 which is connected to the register drive mechanism in a manner to be described more completely hereinafter.

When valve mechanism 18 is open, water (or any other fluid which is being measured) can flow through the high flow passage and this flow produces rotation of turbine blade 39 which is transmitted through the drive mechanism just described to the register mechanism for totalization. When the valve mechanism is closed flow through the high flow passage is blocked and all flow through the meter is diverted through the low flow passage. Before proceeding to a description of the low flow passage it should be noted at this point that, since the turbine blade is disposed in a passage which is closed to the interior of the meter housing except for its inlet and outlet openings, when the valve mechanism is closed no flow occurs through the turbine blade so that high flow measuring element 10 is at rest.

With particular reference to FIGS. 1, 2 and 3, low flow element chamber 46 communicates with inlet 24 through opening 48. As illustrated in FIGS. 1 and 3, opening 48 is shown closed by a resilient flap-type check valve 51, the structure and function of which will be described more completely hereinafter. At this point it is sufficient to note that check valve 51 will open under the pressure of the medium entering the meter to permit the medium to flow into low flow element chamber 46. The medium also flows into nutating disk chamber 50 and is discharged from the nutating disk chamber through opening 52 (see FIG. 3) into low flow passage 16. Passage of the fluid through the nutating disk chamber produces motion of disk 54 in a conventional manner and this motion is converted into rotary motion by mechanism 53 to produce rotation of magnetic member 55. Rotation of magnetic member 55 is transmitted through imperforate wall 57 to a second magnetic member 59 from which it is transmitted through the register drive again in a manner to be described more completely hereinafter. The low flow passage extends around partition 28 and opens through chamber 61 and restricted orifice 67 into chamber 54 from which it opens through port 56 on the downstream side of the outlet of the high flow passage and valve mechanism 18 to communicate with outlet 26.

Valve mechanism 18 includes a circular valve member 58 supported for pivotal movement relative to member 37 on pin 60 supported in brackets 65 which are an integral part of support frame 62. Sealing engagement between valve member 58 and member 37 is provided by gasket 63 supported on the valve member and having a leg 64 arranged to engage face 66 of member 37. Leg 64 normally protrudes from the valve member so that it can be compressed against face 66 to insure a seal.

Closure means in the form of lever 68 is supported for pivotal movement on pins 73 and 74 connected to depending arms 70 and 72 which are also an integral part of support frame 62. Structurally lever 68 includes spaced arms 80 and 82, which are each connected to a pin 73 and 74 and each carry a roller 76 and 78 arranged for engagement with pads 84 and 86 provided on valve member 58. Arms 80 and 82 are connected by a weighted portion 88 which, in addition to connecting arms 80 and 82, provides a large weight spaced a considerable distance from the pivot point defined by pins 73 and 74 (i.e., as compared to the distance between the pivot point and rollers 76 and 78). Providing a weight spaced outwardly of the point in this manner provides an effective mechanical advantage whereby a considerable closing force is exerted on valve member 58 through rollers 76 and 78 and pads 84 and 86 with a simple arrangement. As illustrated in FIG. 1, when the valve member and lever are in their closed positions the effective center of gravity of lever 68 is on the right-hand side, as viewed in the drawings, or the downstream side of the lever pivot so that the lever is urged in a clockwise direction exerting a closing force on valve member 58. The lever is prevented from clockwise rotation in excess of that shown in FIG. 1 by surfaces 124 at the ends of the lever engaging arms 128 which depend from and are integral with support frame 62.

With this arrangement just described the valve member is held closed against the force of the medium flowing through the meter. The force of the flowing medium acts in opposition to that exerted by the weight of lever 68 and tends to rotate the lever in a counterclockwise direction. When the opening force on valve member 58 exceeds the closing force the valve member will open permitting flow through the high flow passage. In a compound meter it is desirable to achieve an accurate and positive crossover between the high and low flow elements at a flow rate within the range of high measuring accuracy of both measuring elements, in other words, before the flow rates reach a point where they cannot accurately be measured by the high and low flow measuring elements. Moreover, when the increased flow rate occurs if the low flow element is not relieved of the load of attempting to measure the entire flow not only will an inaccurate reading result but, if continued for a sufficiently long time, damage to the low flow element mechanism could result. For this reason, it is desirable that an accurate operational crossover point be provided between the high and low flow passages so that the high flow passage is opened before a flow rate is reached above which inaccuracies of measurement may occur in the low flow element.

Because of the many variables involved in determining both the opening and closing forces exerted on valve member 58, the combination of the valve member and lever 68 alone does not lend itself well to providing an accurate crossover point between the high and low flow passages. In accordance with this invention, this accurate operational crossover is achieved through the provision of a valve opening assist mechanism 90. Structurally, opening assist mechanism 90 includes an elongated shaft 94 which carries a cam member 96 and extends through opening 97 into chamber 61 for connection with a generally circular disk 92 disposed in chamber 61 and correspondingly in the low flow path. The clearance between shaft 94 and opening 97 is exaggerated in the drawings, as these members are close fitting to minimize leakage at that point. Since flow in the low flow passage is through chamber 61 into chamber 54 the flow across the disk and orifice 57 create a pressure differential at that point which acts in a direction tending to lift the disk, shaft 94 and cam 96. Cam 96 includes operating shoulder 98 arranged adjacent an operating roller 100 fixed to lever 68 when the lever and valve member are in their closed positions. As the flow in the low flow passage increases, the pressure differential across disk 92 increases. At the point where the force due to the pressure differential exceeds the total weight of opening assist mechanism 90, disk 92 rises in chamber 61 toward orifice 67. Movement of the disk 92 toward orifice 67 further unbalances the pressures acting on disk 92. After initial movement of disk 92 occurs, a dynamic, unbalance condition is created causing rapid and virtually instantaneous movement at the opening assist mechanism, and correspondingly disk 92, to its uppermost end of travel. This dynamic unbalance condition can be better appreciated when it is remembered that movement of disk 92 occurs because of the pressure differential across the disk due to flow past the disk and through orifice 67, and as the disk moves toward the orifice it restricts flow therethrough to progressively increase the pressure differential. As disk 92 is raised, shoulder 98 engages roller 100 so that the accelerated upward movement of disk 92 is transmitted to and moves lever 68 counterclockwise and virtually instantaneously drives the lever to its full open position illustrated in FIG. 6. This of course reduces the closing force exerted on door 58 and the combination of this rapid reduction in closing force and the increase in opening force exerted by the flowing medium results in instantaneous opening of valve member 58. In this phase of operation orifice 67 cooperates with and could be considered as a part of the valve opening assist means. It will be noted that roller 100, similar to weighted lever 88, is spaced from the lever point a considerable distance thereby requiring a minimum lifting force to pivot the lever.

As valve member 58 swings open the combination of the opening force on the valve member and the force exerted by opening assist means 90 pivot lever 68 in a counterclockwise direction and, when the valve member assumes its full open position as illustrated in FIG. 6, the center of gravity of lever 68 will have been moved to the upstream side of the lever pivot so that the lever swings free of valve member 58 and into engagement with support frame 62 to assume an open, inactive position with respect to the valve member. As will be described more completely hereinafter, the valve member and lever will maintain this open position so long as a predetermined flow rate occurs through the high flow meter.

A weight 112 is connected to disk 92 and provides a force urging shaft 94 and cam 96 downward so that the force on disk 92 due to the increased flow acts against this weight in moving cam 96 to swing the lever away from valve member 58. This arrangement provides a relatively simple and yet effective manner of adjusting the valve mechanism 18 to achieve opening of valve member 58 at a particular desired flow rate by varying the weight 112. More particularly, since operation of the valve open assist means and opening of the valve occur instantaneously with the occurrence of initial movement of disk 92, this point of initial disk movement can be varied by varying weight 112. It will be appreciated that other means of adjustment are also possible for example a suitable arranged spring could be used to urge the disk away from orifice 67.

Disk 92 also functions in the nature of a valve in that it is aligned with orifice 67 and upward movement moves the disk into registry in orifice 67 to thereby obstruct flow in the low flow passage. As can be seen in FIG. 6 disk 92 does not completely interrupt flow in the low flow passage and some clearance is provided between the disk and orifice. In some installations this is desirable as it maintains a slight flow of water through the nutating disk chamber thereby maintaining the nutating disk in motion to prevent its jamming. However, in other installations it is desirable that flow through the low flow passage be completely interruped when the high flow meter is operating and this arrangement lends itself very well to providing that type of operation with only a minor, relatively simple, modification. For example, disk 92 could have a resilient protrusion adapted to cover over orifice 67 with suitable sealing members being provided between it and the port to seal off flow.

In order to insure holding valve member 58 in its open position and to increase the opening force exerted on valve member 58 once the valve member has been initially opened, flap 114 is provided on the underside of valve member 58. Flap 114 is generally arcuate to conform to valve member 58 and protrude from valve member 58 to act as a vane in the fluid and telescope over member 37 when the valve member is in its closed position. As the valve member opens the vane catches the flowing medium and increases the opening force.

In operation and with the valve mechanism 18 assuming the closed position illustrated in FIG. 1 and lever 68 in its operative position holding the valve member closed, all flow is through the low flow passage. As the flow rate increases the opening pressure exerted on valve member 58 and disk 92 increases. At a predetermined flow rate opening assist mechanism will rapidly accelerate upwards as a result of the dynamic unbalancing condition created on disk 92 after initial movement of the disk. This also causes lever 68 to rapidly rotate counterclockwise, in the manner described above, to its full open position wherein its center of gravity is positioned upstream of the lever pivot. In this condition the lever is operatively disconnected from the valve member and the valve member responds merely to flow rate through the high flow valve.

This arrangement achieves an accurate operational crossover from the low flow element to the high flow element. It is also desirable to achieve an accurate crossover from the high flow element to the low flow element and this is also achieved in the illustrated embodiment. In this respect, the valve mechanism will maintain the position illustrated in FIG. 6 so long as an adequate flow rate is maintained through high flow passage 14. At this point it should be noted that lever 68 is held against clockwise movement by the cooperation of an arcuate face 103 on cam member 104 attached to and movable with valve member 58 and roller 102 supported on arm 82 of lever 68. As can be seen in FIG. 1 when valve mechanism 18 is closed member 104 and roller 102 are spaced from each other but move into contact as the lever and valve member swing open about their respective pivots. Roller 102 and member 104 are so related that engagement therebetween occurs at approximately the point where the lever center of gravity is disposed vertically above the pivot point thereby insuring lever movement through its overcenter position and preventing the lever from falling back to its closed position unless the opening force on valve 58 has been reduced sufficiently to move member 104 out of engagement with roller 102. Also, disk 92 is held in registry in orifice 67 through the cooperation of pin 108 on lever arm 80 which engages the underside of arm 106 of cam 96 when the lever has swung to its open inoperative position (see FIG. 7). Accordingly, lever 68 is held in positon of FIG. 6 by its center of gravity being on the upstream side of the pivot point and the cooperation between roller 102 and member 104 and with the lever so held disk 92 is also held in registry in port 110 to insure that the low flow passage is obstructed so long as the high flow passage is open.

In closing, valve member 58 will swing downwardly toward member 37 in response to reduced flo through the high flow passage. Throughout the initial portion of this downward movement of valve 58 lever 18 is prevented from leaving its open position by the cooperation of surface 103 and roller 102 and disk 92 is held in orifice 67 by the engagement between the lever and cam 96. After the valve member has swung a sufficient distance to free roller 102 the lever is released for movement to its operative position exerting a closing force on valve member 58. A roller 116 is supported on arm 117 and is connected to and movable with valve member 58 to engage and move the lever overcenter and permit it to drop and re-engage the valve member. Roller 116 is positioned on the opposite side of pivot pin 60 and it is arranged to pivot into engagement with surface 118 of cross arm 88 of the lever. The parts are so designed that roller 116 moves into engagement with surface 118 at, or just after, the point at which roller 102 is freed from surface 103 so that further movement of the valve member toward a closed position transmits a clockwise rotational force to the lever to move the lever and displace its center of gravity to a downstream position with respect to the lever pivot. As soon as the center of gravity of the lever is downstream of the pivot the lever is drawn down by its own weight, re-engages the valve and exerts a closing force on valve member 58 to positively close the valve member against flow through the high flow passage. The cooperation of lever 68 with the valve member insures accurate interruption of the flow through the high flow passage and, moreover, with this arrangement full flow through the low flow passage is not initated until lever 68 swings to its closed position thereby providing an accurate opertaional crossover between the high flow and low flow passages on closure of valve 58 as well as on opening.

Extension 37, valve member pivot support arms 60 and closure member support arms 70 and 72 are integrally formed as a part of support frame 62 and as a single casting. This facilitates and insures accurate machining of face 64 of extension 37, which provides the valve seat, and the pivot supports for the valve and closure member. With a single casting an accurate relationship between the pivots and the valve seat can be achieved to insure a positive seal-off and operational cooperation between the closure member and valve member 58.

An alternative form of the valve member is illustrated in FIG. 8 wherein the engagement between valve member 58 and lever 68 has been modified so that lever 68 holds valve member 58 closed with a toggle type action. More particularly, the roller engaging surface 85 of pad 84' (only one pad being illustrated for convenience in FIG. 8) is angled so that the line of action of the opening force exerted through the valve member on roller 76' passes above the pivot point provided by pin 73'. Accordingly, an increased opening force on valve member 58 actually increases the closing force exerted on the valve member by lever 68. Valve member 58 remains closed until the valve member assist opening mechanism has moved lever 68 overcenter in a counterclockwise direction, i.e. a sufficient distance so that the line of action acts below the pivot point whereupon the valve member and lever can snap open and move rapidly to their open positions. This toggle type arrangement permits still a greater degree of accuracy in selecting the opening point of the valve member 58.

Since the valve mechanism will snap open rather violently, it is susceptible to producing noise which is transmitted through a water line for example. To reduce the noise level, some of the elements of the valve mechanism are made of resilient material and resilient bumpers are strategically placed through the valve mechanism at points where metal engagement and resultant noise might occur. More specifically, roller 116 is made of resilient material and resilient bumpers 120, 122, 123 and 95 are provided on lever 68, cam 96, cross member 88, and under disk 92, respectively. Similarly, either surfaces 126, which act as a step for clockwise movement of the lever, or arms 128, or both, are provided with a layer of resilient material to reduce the possibility of creating noise at that point. Furthermore, support frame 62 is connected to the meter housing by resilient mounts 99, only one of which is illustrated in detail in the drawing, to isolate the frame from the housing. Isolation of the frame is completed by interpassing resilient seal 27 (FIG. 3) between frame 62 and cover 22 and seal 33 between extension 37 and partition 28.

Reference will now be made to FIG. 1 for a more complete description of the structure and function of check valve 51. Structurally flap 130 extends over and completely closes opening 48. Flap 130 includes a central hub 132 engaged in a generally rigid screen 134 which is in turn suitably anchored at opening 48. With this construction flap 130 is free to flex about hub 132 to alternately open and close the opening to flow. In some instances it may be desirable to shut down the line downstream of the compound meter for repairs and it is desirable that the upstream fluid in the line not flow back through the compound meter. Valve mechanism 18 acts as a check valve with respect to the high flow passage and check valve 51 provides this function with respect to the low flow passage and without materially interfering with normal flow.

To protect against interruption of service should the low flow measuring element jam, a valve mechanism 136 is provided which can open an auxiliary path to the low flow passage 16 bypassing the low flow element. Valve mechanism 136 includes valve 138 biased into engagement with seat 140 by compression spring 142. Under conditions of normal operation valve mechanism 136 remains inoperative but should the low flow element 12 fail to operate and the pressure at inlet 24 increase above a recognized safe value valve, mechanism 136 will open to permit flow through the low flow passage without having to pass through the low flow meter and thereby operate assist mechanism 90 as described above to open valve 58.

Having described the flow operation of the compound meter a description will now be made of the register mechanism for the compound meter. Since the compound meter is called upon to totalize the fluid measured by two elements it must provide a drive from both elements. In accordance with this invention the low flow register drive includes magnetic member 59 which is driven by magnetic member 55 in the manner described above. Motion of member 59 is transmitted to gear train 146 illustrated partially schematically in FIGS. 1 and 10 and which contains ratio gears 143 and 145 used for adapting the total gear ratio for various units of liquid measure. Similarly, the high flow meter drive includes magnetic member 49 which is driven by magnetic member 45 and also includes gear drive 150 which includes ratio gears 149 and 151 also for measuring unit adjustment. Compensation for variations in the high flow measuring element are made by ratio gears 44 (FIG. 1). The high and low flow register drives are connected to a single register stack 152 through differential 154. For purposes of calibration each of the register drives are connected to separate calibration readout indicators 156 and 158. The take-off to high flow indicator 156 is from change gear 151, through shaft 153, gears 155 and 157, and sleeve 159 attached to the indicator. Similarly, the take-off to low flow indicator 158 is from change gear 143 through shaft 161, gears 163, 165 and 167, and shaft 169 disposed within sleeve 159 and connected to the indicator. It will be noted that the take-off to each indicator is made before the input to the differential.

In the calibrating step the necessary ratio gears are selected for gear drives 146 and 160 to achieve one revolution of the indicators 156 and 158 for a given volume of flow. In the usual case, one revolution of indicator 158 corresponds to a volume of fluid one-tenth of that indicated by one revolution of indicator 156. For example, where the meter is to record fluid volume using gallons as a unit of measure, one revolution of indicators 156 and 158 corresponds to 100 and 10 gallons of fluid, respectively. The advantage of an indicator for each metering element is the ability to separately calibrate and determine the measurement accuracy of each metering element separately.

Returning now to the single register totalization stack 152, gear drive 150 is connected directly to differential 154 without further reduction. A 10:1 gear reduction is interposed between gear drive 146 and differential 154 in order to equalize the high and low flow meter elements input to the differential. In the illustrated embodiment this gear reduction is through gears 171, 173, 175 and 177.

Differential 154 is of the conventional spur gear type, but can take any well-known form. As illustrated the differential includes spur gears 179 and 181 rotatably mounted on spider frame 183 by separate shafts. Spur gear 181 is driven from the low flow element drive through gear 191 which rotates with shaft 193 in response to rotation of gear 177 of the reduction gear train of the low flow element drive. Spur gear 179 is driven from gear 195 connected to hub 185, the hub being connected to and rotatable with gear 197 in response to rotation of gear 199 of the high flow element drive. Spur gears 179 and 181 meet at 180 so that rotation of either gear 179 or 181 is relative to the other and thereby causes rotation of spider frame 183. The spider frame is free to rotate with respect to hub 185 but is fixed to hub 187 which carries output gear 189. Output gear 189 is connected to register stack 152 through a gear drive 201 which, if desired, may produce further gear reduction.

The differential is effective to totalize the output from both the high and low flow elements and transmit it to the single register stack where a usual readout of total flow through the high and low flow elements is provided. This arrangement offers the advantage that it permits operation with a single register stack and, moreover, in that it provides an arrangement whereby the flow through both measuring elements is totalized in contrast to various prior arrangements wherein the drive to the register stack was such that only the meter which was being driven at the highest speed would register.

Although this invention has been illustrated and described in connection with particular embodiments thereof, it will be apparent to those skilled in the art that various changes and modifications may be made therein without departing from the spirit of the invention or from the scope of the appended claims.

I claim:

1. In a compound meter including a housing, means defining first and second flow passages in said housing, and first and second flow measuring elements for measuring flow through said first and second flow passages; the combination of a valve member in said first flow passage and mounted for movement to open and close said first flow passage, a lever, means mounting said lever in said housing adjacent to said valve member for engagement therewith to hold said valve member closed with a predetermined force and for pivotal movement of said lever relative to said valve member, and valve member opening assist means exposed to and responsive to flow through said second flow passage and connected with said lever, said assist means being movable in response to flow in said low flow passage and operative to transmit movement thereof in response to increased flow in said second flow passage to initiate movement of said lever relative to said valve member to reduce the force with which said lever is urging said valve member closed, said lever holding said valve member closed with a positive force and being moved by said assist means relative to said valve member and independent of the pressure in said first flow passage on said valve member to reduce said force exerted by said lever whereby said valve member does not begin opening until said lever has been moved by said assist means.

2. The compound meter of claim 1 wherein said valve member opening assist means includes means defining an area across which a pressure differential occurs in accordance with flow through the low flow passage, said last mentioned means responding to a predetermined flow rate in said low flow passage to initiate movement of said valve opening assist means and movement of said valve opening assist means progressively increasing the pressure differential at said area so that a dynamically unbalanced pressure differential condition occurs at said area to produce instantaneous movement of said valve opening assist means and said lever.

3. In a compound meter including a housing, means defining high and low flow passages in said housing, and high and low flow measuring elements for measuring flow through said high and low flow passages; the combination of a valve member in said high flow passage and mounted for movement to open and close said high flow passage, a lever, means connecting said lever in said housing adjacent to said valve member for operative engagement therewith to hold said valve member closed with a predetermined closing force, said connecting means further supporting said lever for pivotal movement with respect to said valve member between a first position in said operative engagement with said valve member and with the center of gravity of said lever disposed, with respect to flow through said high flow passage, to one side of the pivot for said lever and a second position operatively disengaged from said valve member and with the center of gravity of said lever disposed on the opposite side of said pivot, valve member opening assist means exposed to and responsive to flow through said low flow passage and operatively connected with said lever, said assist means being movable in response to flow in said low flow passage and operative to transmit movement thereof in response to increased flow in said low flow passage to pivot said lever away from said first position and operative engagement with said valve member to reduce the closing force exerted on said valve member and toward said second position, and means responsive to reduced flow through said high flow passage to engage and move said lever from said second position toward said first position.

4. In a compound meter including a housing, means defining high and low flow passages in said housing, and high and low flow measuring elements for measuring flow through said high and low flow passages; the combination of a valve member in said high flow passage and mounted for movement to open and close said high flow passage, a lever, means connecting said lever in said housing adjacent to said valve member for operative engagement therewith to hold said valve member closed with a predetermined closing force, said connecting means further supporting said lever for pivotal movement with respect to said valve member between a first position in operative engagement with said valve member and with the center of gravity of said lever disposed, with respect to flow through said high flow passage, to one side of the pivot for said lever and a second position operatively disengaged from said valve member and with the center of gravity of said lever disposed on the opposite side of said pivot, valve member opening assist means exposed to and responsive to flow through said low flow passage and arranged operatively adjacent said lever, said assist means being movable with respect to said low flow passage and operative to transmit movement thereof in response to increased flow in said low flow passage to pivot said lever away from said first position and operative engagement with said valve member to reduce the closing force exerted on said valve member and toward said second position, the point of engagement of said lever with said valve member and the pivot for said lever relatively arranged so that said lever holds said valve member closed with a toggle action and said valve member is positively held closed until said valve member opening assist means has moved said lever through an over center position with respect to said pivot, and means responsive to reduced flow through said high flow passage to engage and move said lever from said second position toward said first position.

5. The compound meter of claim 3 wherein said valve member closes against the direction of flow in said high flow passage and said means for moving said lever from said second to said first position comprises means connected to said valve member arranged to engage and move said lever from said second position toward said first position as said valve member moves toward a closed position in response to reduced flow through said high flow passage.

6. In a compound meter including a housing, means defining high and low flow passages in said housing, and high and low flow measuring elements for measuring flow through said high and low flow passages; the combination of a valve member in said high flow passage and mounted for movement to open and close said high flow passage, a lever, means connecting said lever in said housing adjacent to said valve member for operative engagement therewith to hold said valve member closed with a predetermined closing force, said connecting means further supporting said lever for pivotal movement with respect to said valve member between a first position in operative engagement with said valve member and with the center of gravity of said lever disposed, with respect to flow through said high flow passage, to one side of the pivot for said lever and a second position operatively disengaged from said valve member and with the center of gravity of said lever disposed on the opposite side of said pivot, valve member opening assist means exposed to and responsive to flow through said low flow passage and arranged operatively adjacent said lever, said assist means being movable with respect to said low flow passage and operative to transmit movement thereof in response to increased flow in said low flow passage to pivot said lever away from said first position and operative engagement with said valve member to reduce the closing force exerted on said valve member and toward said second position, means responsive to reduced flow through said high flow passage to engage and move said lever from said second position toward said first position, means defining a restricted orifice in said low flow passage, and said valve assist opening means also including a second member movable in said low flow passage with respect to said orifice and means supporting said second member for movement in response to increased flow in said low flow passage toward a position in registry with said orifice, said second member responding to a predetermined flow rate through said low flow passage to initiate movement thereof toward said restricted orifice which movement progressively increases the pressure differential across said second member to dynamically create an unbalanced pressure differential at said second member so that instantaneous movement of said valve opening assist means and said lever occurs.

7. The compound meter of claim 3 wherein said first and second passages are isolated so that with closure of said high flow passage flow occurs only through said low flow passage, and including an auxiliary opening to said second passage and pressure responsive valve means controlling flow through said auxiliary opening and connected between the inlet to said meter arrangement and said low flow passage and operative in response to a pressure at said inlet above a predetermined value to open said auxiliary opening and permit flow from said inlet through said low flow passage.

8. The compound meter of claim 3 wherein said valve member closes against the direction of flow through said high flow passage, and including check valve means for controlling flow through said low flow passage and operative to permit flow in one direction and check flow in the opposite direction.

9. In a compound meter including means defining first and second flow passages in said meter and first and second meters for measuring flow through said first and second passages; the combination of a valve member in said first passage and mounted to close said first passage against the flow therethrough and for movement from a closed position to an open position in response to increased flow through said compound meter, closure means supported for operative engagement with said valve member and effective when engaged with said valve member to exert a closing force on said valve member in opposition to flow through said first flow passage to hold said valve member closed, said closure means further supported for movement relative to said valve member to reduce the force with which said valve member is held closed, and valve member opening assist means disposed directly in the flow through said second passage and connected to said closure means, said opening assist means operative in response to increased flow through said second passage to initiate movement of said closure means relative to said valve member to reduce the force with which said closure means urges said valve member toward its closed position, said closure means holding said valve member closed with a positive force and being moved by said assist means relative to said valve member and independent of the pressure in said first passage on said valve member to reduce said force exerted by said closure means whereby said valve member does not begin opening until said closure means has been moved by said assist means.

10. A valve arrangement for controlling flow through first and second flow passages and comprising, in combination, a valve member in said first passage and mounted for movement to open and close said first passage to flow, closure means supported for operative engagement with said valve member and operative when engaged with said valve member to exert a closing force on said valve member in opposition to flow through said first flow passage to hold said valve member closed, said closure means further supported for movement relative to said valve member to reduce the force with which said valve member is held closed, and valve member opening assist means disposed directly in the flow through said second passage and connected to said closure means, said opening assist means operative in response to increased flow through said second passage to initiate movement of said closure means relative to said valve member to reduce the force with which said closure means urges said valve member toward its closed position, said closure means holding said valve member closed with a positive force and being moved by said assist means relative to said valve member and independent of the pressure in said first passage on said valve member to reduce said force exerted by said closure means whereby said valve member does not begin opening until said closure means has been moved by said assist means.

11. The valve arrangement of claim 10 wherein said opening assist means includes a movable member disposed in said second passage and movable relative to a restricted orifice in said second passage, said flow repsonsive means responding to the pressure differential across said movable member and being rendered operative as movement of said movable member is initiated in response to a predetermined pressure differential across said movable member with said pressure differential increasing as said movable member moves toward said restricted orifice producing a progressive and dynamically increasing pressure differential on said movable member so that instantaneous movement of said closure means results.

12. A valve arrangement for controlling flow through first and second flow passages and comprising, in combination, a valve member in said first passage and mounted for movement to open and close said first passage, a lever, means connecting said lever adjacent to said valve member for operative engagement therewith to hold said valve member closed with a predetermined closing force, said connecting means further supporting said lever for pivotal movement with respect to said valve member between a first position in operative engagement with said valve member and with the center of gravity of said lever disposed, with respect to flow through said first flow passage, to one side of the pivot for said lever and a second position operatively disengaged from said valve member and with the center of gravity of said lever disposed on the opposite side of said pivot, valve member opening assist means exposed to and responsive to flow through said second passage and connected to said lever, said assist means being movable with respect to said second passage and operative to transmit movement thereof in response to increased flow in said second passage to pivot said lever away from said first position and operative engagement with said valve member to reduce the closing force exerted on said valve member and toward said second position, and means responsive to reduce flow through said first passage to engage and move said lever from said second position toward said first position.

13. The valve arrangement of claim 12 wherein the point of engagement of said lever with said valve member and the pivot for said lever are relatively arranged so that said lever holds said valve member closed with a toggle action and said valve member is positively held closed until said valve opening assist means has moved said lever through an overcenter position with respect to said pivot.

14. In a compound meter including a housing, means defining first and second flow passages in said housing, and first and second elements for measuring flow through said first and second flow passages; the combination of a valve seat in said first flow passage, a valve member, means mounting said valve member for movement relative to said valve seat to open and close said first flow passage and so that said valve member closes on said seat against the direction of flow through said first flow passage, lever means, means mounting said lever means for pivotal movement relative to said valve member into and out of a first position in operative engagement with said valve member and with the center of gravity of said lever disposed downstream of said pivot to exert a closing force on said valve member when engaged therewith, means and arranged to limit movement of said lever means are arranged to limit movement of said lever means away from said first position to a second position wherein said lever means is operatively disengaged from said valve member and with said center of gravity arranged upstream of said pivot, valve member opening assist means connected to said lever means and operative to initiate movement of said lever means from said first position toward said second position in response to an increase in flow through said compound meter and independent of the pressure in said first flow passage on said valve member to decrease the closing force exerted on the valve member whereby said valve member does not begin opening until said lever has been moved by said assist means, said lever means being operatively disconnected from said valve member when said lever means is in said second position so that said valve member responds to flow through said first passage independently of said lever means, and means operatively associated with said lever means and effective to move said lever means from said second position toward said first position in response to decreased flow through said compound meter so that said lever means is moved for operative re-engagement with said valve member to exert a closing force thereon.

15. The compound meter of claim 14 wherein said last-mentioned means comprises a member connected to and movable with said valve member to engage and move said lever means in response to reduced flow through said first flow passage.

16. In a compound meter including a housing, means defining first and second flow passages in said housing, and first and second elements for measuring flow through said first and second flow passages; the combination of a valve seat in said first flow passage, a valve member, means mounting said valve member for movement relative to said valve seat to open and close said first flow passage and so that said valve member closes on said seat against the direction of flow through said first flow passage, lever means, means mounting said lever means for pivotal movement into and out of a first position in operative engagement with said valve member and with the center of gravity of said lever disposed downstream of said pivot to exert a closing force on said valve member, means disposed in the path of movement of said lever means and arranged to limit movement of said lever means away from said first position to a second position wherein said lever means is operatively disengaged from said valve member and with said center of gravity arranged upstream of said pivot, valve member opening assist means connected to said lever means and operative to move said lever means from said first position toward said second position in response to an increase in flow through said compound meter, said lever means being operatively disconnected from said valve member when said lever means is in said second position so that said valve member responds to flow through said first passage independently of said lever means, means operatively associated with said lever means and effective to move said lever means from said second position toward said first position in response to decreased flow through said compound meter so that said lever means is moved for operative re-engagement with said valve member to exert a closing force thereon, means defining an orifice in said second passage, and said assist means including a second valve member movable in said second passage toward a position registering in said orifice in response to an increase in flow in said second passage.

17. The compound meter of claim 16 including means operatively connecting said lever means and said second valve member to hold said second valve member in registry in said orifice when said lever means is positioned with said center of gravity upstream of said pivot.

18. The compound meter of claim 16 including means on said valve member and said lever means having a sliding connection therebetween as said valve member moves open and said lever means moves toward said second position and effective to hold said lever means against movement from said second position while said valve member is open and until said valve member moves back toward its closed position.

19. The compound meter of claim 14 wherein said valve seat, said valve member mounting means, and said lever mounting means are provided in an integral member.

20. A compound meter comprising, in combination, a housing, means defining inlet and outlet openings in said housing, means defining a first flow passage in said housing between said inlet and outlet openings, first flow measuring means exposed to and operative to measure the flow through said first flow passage, means defining a valve seat in said first flow passage between said inlet and outlet openings, means defining a second flow passage around and opening on the upstream and downstream sides of said valve seat, second flow measuring means exposed to and operative to measure the flow through said second flow passage, a valve member, means supporting said valve member in said housing for movement into closing engagement with said valve seat against the direction of flow through said first flow passage and, when in engagement with said valve seat, causing flow between said inlet and outlet to pass through said second flow passage, closure means pivotally mounted in said housing for movement relative to said valve member into a first position connected to and holding said valve member closed on said valve seat and away from said first position to release said valve member for movement away from said seat, said closure means in said first position exerting a predetermined closing force on said valve member, and valve member opening assist means exposed to the flow in said second flow passage, connected to said closure means and operative in response to an increase in flow through said second flow passage to initiate movement of said closure means away from said valve member independent of the pressure in said first flow passage on said valve member to decrease the closing force exerted on said valve member whereby said valve member does not begin opening until said lever has been moved by said assist means.

21. A compound meter comprising, in combination, a housing, means defining inlet and outlet opening in said housing, means defining a first flow passage in said housing between said inlet and outlet openings, first flow measuring means exposed to and operative to measure the flow through said first flow passage, means defining a valve seat in said first flow passage between said inlet and outlet openings, means defining a second flow passage around and opening on the upstream and downstream sides of said valve seat, second flow measuring means exposed to and operative to measure the flow through said second flow passage, a valve member, means supporting said valve member in said housing for movement into closing engagement with said valve seat against the direction of flow through said first flow passage and, when in engagement with said valve seat, causing flow between said inlet and outlet to pass through said second flow passage, closure means pivotally mounted in said housing for movement into a first position holding said valve member closed on said valve seat and away from said first position to release said valve member for movement away from said seat, valve member opening assist means exposed to the flow in said second flow passage, arranged operatively adjacent said closure means and operative in response to an increase in flow through said second flow passage to move said closure means away from said valve member, said closure means comprising a lever and means mounting said lever for pivotal movement into and out of engagement with said valve member and with the center of gravity of said lever arranged downstream of the lever pivot when said lever is holding said valve member closed, and said assist means being operative to move said lever in one direction away from said valve member and with said center of gravity moving upstream of said pivot as said valve member moves toward a full open position.

22. The compound meter of claim 21 including means connected to and movable with valve member and arranged to engage said lever when said valve member is moving toward its closed position to pivot said lever and move said center of gravity in an opposite direction and downstream of said pivot so that as said valve member moves toward said seat said lever pivots toward said valve member to exert a closing force thereon.

23. The compound meter of claim 22 wherein a restricted orifice is provided in said second flow passage, and said valve member opening assist means includes a second valve member movable toward registry in and to restrict flow through said orifice, said valve member opening assist means responding to movement of said second valve member and said second valve member moving in accordance with the pressure differential occurring across said second valve member due to flow in said second passage.

24. A compound meter comprising, in combination, a housing, means defining inlet and outlet openings in said housing, a generally hollow high flow passage defining member having relatively spaced inlet and outlet openings communicating with said housing inlet and outlet, respectively, and an extension between said inlet and outlet which is closed to the interior of said housing, first flow measuring means exposed to and operative to measure flow through said hollow member, a valve member, means supporting said valve member and for pivotal movement into and out of closing engagement with the outside of said hollow member, means defining a second flow passage around and opening on the upstream and downstream sides of said valve member and said hollow member outlet so that when said valve member is closed on said hollow member outlet flow through said housing passes only through said second flow passage, second flow measuring means exposed to and operative to measure flow through said second passage, a lever, means pivotally mounting said lever for movement into and out of engagement with said valve member and with the center of gravity of said lever arranged downstream of the lever pivot when said valve member is closed so that said lever exerts a closing force on said valve member, and valve member opening assist means exposed to the flow in said second flow passage, connected to said lever and operative in response to an increase in flow through said second flow passage to move said lever away from said valve member to reduce the closing force exerted thereon.

25. A compound meter comprising, in combination, a housing, means defining inlet and outlet openings in said housing, a generally hollow high flow passage defining member having relatively spaced inlet and outlet openings communicating with said housing inlet and outlet, respectively, and an extension between said inlet and outlet which is closed to the interior of said housing, first flow measuring means exposed to and operative to measure flow through said hollow member, a valve member, means supporting said valve member for pivotal movement into and out of closing engagement with the outlet of said hollow member, means defining a second flow passage around and opening on the upstream and downstream sides of said valve member and said hollow member outlet so that when said valve member is closed on said hollow member outlet flow through said housing passes only through said second flow passage, second flow measuring means exposed to and operative to measure flow through said second passage, a lever, means pivotally mounting said lever for movement into and out of engagement with said valve member and with the center of gravity of said lever arranged downstream of the lever pivot when said valve member is closed so that said lever exerts a closing force on said valve member, valve member opening assist means exposed to the flow in said second flow passage, connected to said lever and operative in response to an increase in flow through said second flow passage to move said lever away from said valve member to reduce the closing force exerted thereon, said assist means and said valve member, as it moves away from said hollow member outlet, moving said lever toward a position wherein said center of gravity is disposed upstream of said pivot, said lever assuming said position with the center of gravity thereof upstream of said pivot when said valve member assumes its full open position and said lever being operatively disconnected from said valve member so that said valve member responds to flow through said high flow passage, and means connected to and movable with said valve member and operative to engage said lever, as said valve member moves toward its closed position, and move said center of gravity from said upstream position toward said downstream position.

26. The compound meter of claim 25 including means defining a restricted orifice in said second passage wherein said assist means includes a second valve member movable in said second passage toward a position registering in said orifice in response to an increase in flow in said second passage and the corresponding pressure differential across said second valve member, and also including means operatively connecting said lever and said second valve member to hold said second valve member in registry with said restricted orifice when said lever is positioned with said center of gravity upstream of said pivot.

27. The compound meter of claim 26 including registering means for totaling the flow through said high and low flow passages, said registering means comprising, in combination, a single register stack assembly, said first and second flow measuring means each including a separate drive train driven in accordance with flow through respective ones of said high and low flow passages, and a differential drive operatively interposed between said register means and said first and second drive trains and transmitting driven motion of both drive trains to said register means for totalization.

28. The compound meter of claim 27 including means for separately calibrating the first and second drive trains and correspondingly said high and low flow measuring means, said calibrating means comprising, a high flow indicator, means connecting said high flow indicator to said first drive train at a point in said first drive train prior to said differential.

a low flow indicator, and means connecting said low flow indicator to said second drive train at a point in said second drive train prior to said differential drive.

References Cited

UNITED STATES PATENTS 2,165,153   7/1939   Purdie _____ 73—197 X

RICHARD C. QUEISSER, *Primary Examiner.*

E. D. GILHOOLY, *Assistant Examiner.*